April 8, 1930. T. V. BUCKWALTER 1,753,771
PROCESS OF REMOVING BEARINGS FROM AXLES
Filed Dec. 27, 1927
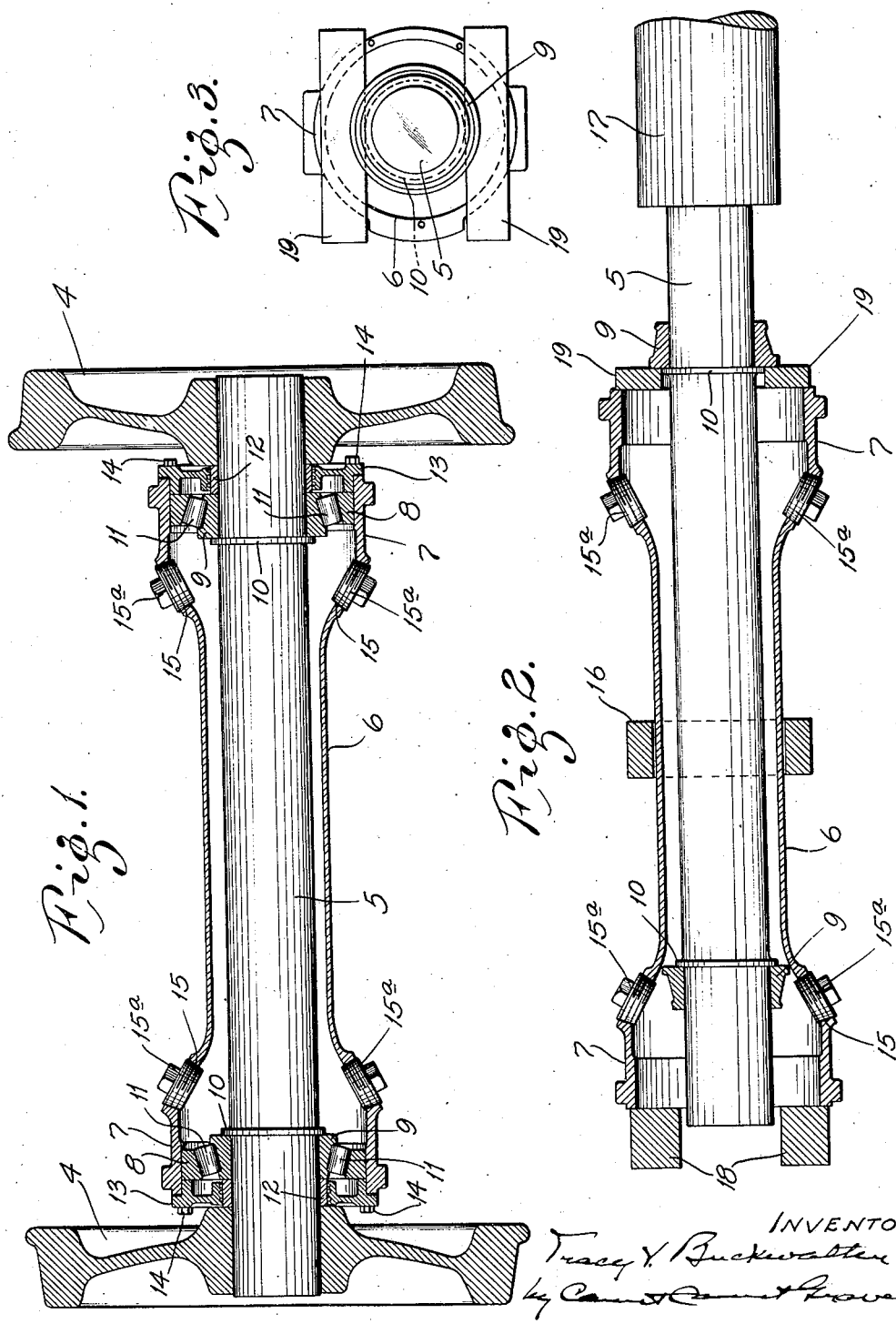
INVENTOR:
Tracy V. Buckwalter
by Connolly Connolly & Gravely
HIS ATTORNEYS Patented Apr. 8, 1930

1,753,771

UNITED STATES PATENT OFFICE

TRACY V. BUCKWALTER, OF CANTON, OHIO, ASSIGNOR TO THE TIMKEN ROLLER BEARING COMPANY, OF CANTON, OHIO, A CORPORATION OF OHIO

PROCESS OF REMOVING BEARINGS FROM AXLES

Application filed December 27, 1927. Serial No. 242,929.

My invention relates to the removal of roller bearings from roller bearing axle constructions of the type wherein the roller bearings are located in the enlarged end portions of a tubular housing that encloses a solid axle and have their inner bearing members press-fitted on said axle. The principal object of the present invention is to provide a practicable and economical process of removing the inner bearing member of the roller bearing from the axle; and also to provide an axle construction whose bearing is particularly adapted for removal according to said process. The invention consists in the process hereinafter described and claimed.

Fig. 1 is a longitudinal sectional view of a roller bearing axle construction in running condition;

Fig. 2 is a similar section showing parts removed from the axle construction and an apparatus suitable for carrying out my process of removing the cone of one of the roller bearings from one end of the axle; and Fig. 3 is an end view of the axle construction and bearing removing apparatus shown in Fig. 2.

The roller bearing axle construction illustrated in the accompanying drawing comprises wheels 4 secured to the ends of a solid axle 5, and a tubular axle housing 6 surrounding said solid axle between said wheels and having enlarged cylindrical end portions 7 adapted to receive roller bearings. As shown in the drawing, each of the roller bearings preferably comprises an outer raceway member in the form of a conical cup 8, which is seated in the chamber formed by the enlarged end portion of the axle housing; an inner raceway member in the form of a cone 9 mounted on the solid axle with its inner end abutting against a collar 10 thereon; and tapered antifriction rollers 11 interposed between said cup and said cone. In practice, the cup 8 is pressed into the enlarged chamber in the end of the axle housing and the cones are press-fitted on the axle and seat against the collar thereon. An annular spacer 12 is mounted on the axle between the bearing cone and the wheel; and the end of the enlarged bearing chamber at the end of the axle housing, which serves as a reservoir for lubricant, is closed by means of an annular closure plate 13, which surrounds said spacer and is removably secured to the end of the axle housing by means of cap screws 14.

As shown in the drawing, the flared end portion of the axle housing is provided adjacent to the bearing with one or more openings 15 that are closed by threaded plugs 15ª. The openings serve as hand-holes, into which the hand may be inserted to inspect the bearing; and they also serve as oil-holes through which lubricant may be supplied to the enlarged bearing chamber at the end of the housing.

When it is desired to remove a roller bearing from the above roller bearing axle construction, the entire axle construction is removed from the truck, and the wheels 4, closure plates 13, spacers 12, and roller bearing cups 8, are then removed from said axle construction. The axle construction is then supported in a suitable wheel press by means of the press sling 16 and the axle 5 moved endwise in the axle housing 6 far enough to carry the cone at one end of said axle clear of the adjacent end of said housing. This endwise sliding movement of the axle 5 in the axle housing 6 is permitted by reason of a fact that the enlarged cylindrical chambers at the end of the housing are made long enough to permit one bearing cone to move clear of one end of the axle housing before the other bearing cone abuts against the outwardly flared portion at opposite end of said housing and thus prevents further endwise movement of the axle.

As shown in Fig. 2 of the drawing, the axle construction is supported in the press with the end of the axle having the exposed cone thereon in position to be engaged by the ram 17 of said press and with the opposite end of the axle housing abutting against the press parallel members 18. Bars 19 are then placed across the end of the axle housing, between said end and the adjacent inner end of the exposed cone. The exposed cone is then stripped from the axle by moving the ram 17 of the press into engagement with the end of the axle thereby forcing the axle through the cone, the cone being held against movement with the axle by means of the bars 19 which bear against one end of the axle housing whose opposite end abuts against the press parallels 18. After the removal of one of the cones from the axle, the axle may be withdrawn from the housing and the remaining cone removed from the axle in any desired manner.

While the hereinbefore described bearing removing process is particularly adapted in removing cones from roller bearing axle constructions of the type illustrated, it is also applicable to other types of roller bearing axle constructions; and, of course, other means may be used for pressing the axle from the cone and holding the cone and other parts of the axle construction against movement with the axle.

What I claim is:

1. The process of removing the inner raceway member of a roller bearing from a roller bearing axle construction wherein an axle is enclosed within a tubular axle housing and said bearing is interposed between said axle and said housing with its inner raceway member press-fitted on said axle, which consists in moving said axle endwise of said housing towards one end thereof far enough to move said inner raceway member clear of said end, interposing a member between said end of said housing and the adjacent end of said inner raceway member, and then pressing said axle endwise through said inner raceway member towards the other end of said housing while holding said axle housing against movement in such direction.

2. The process of removing the inner raceway member of a roller bearing from a roller bearing axle construction wherein an axle is enclosed within a tubular axle housing and said bearing is interposed between said axle and an enlarged end portion of said housing with its inner raceway member mounted on said axle and abutting at its inner end against a shoulder thereon, which consists in moving said axle endwise of said housing towards one end thereof far enough to permit said inner raceway member to be engaged by a device for preventing inward sliding movement of said raceway member and then pressing said axle endwise through said cone towards the other end of said housing.

3. The process of removing the inner raceway member of a roller bearing from a roller bearing axle construction wherein an axle is enclosed within a tubular axle housing and said bearing is interposed between said axle and an enlarged end portion of said housing with its inner raceway member press-fitted on said axle, which consists in moving said axle endwise of said housing towards one end thereof far enough to move said raceway member clear of said end, placing a cross-member between the enlarged end portion of said housing and the inner end of said bearing member, and then pressing said axle endwise through said bearing member towards the other end of said housing while holding the said housing against endwise movement in said direction.

4. The process of removing the inner raceway member of a roller bearing from a roller bearing axle construction wherein an axle is enclosed within a tubular axle housing and said bearing is interposed between said axle and an enlarged end portion of said housing with its inner raceway member press-fitted on and abutting at its inner end against a shoulder thereon, which consists in moving said axle endwise of said housing far enough to move said inner raceway member clear of the enlarged end thereof, interposing cross-bars on opposite sides of said axle between said end of said housing and the adjacent end of said inner bearing member, and then pressing said axle endwise through said cone towards the other end of said housing while holding the housing against movement with the axle.

5. The process of removing the inner raceway member of a roller bearing from a roller bearing axle construction wherein an axle is enclosed in a tubular axle housing and has wheels pressed thereon beyond the ends of said housing, said bearing is interposed between said axle and an enlarged end portion of said housing with its outer raceway member seated in said enlarged end portion of said housing and with its inner raceway member press-fitted on said axle, and the enlarged end of said housing is closed by an annular closure plate sleeved on said axle between the said inner raceway member and the wheel, which consists in removing said wheel, closure plate, and outer raceway member, moving said axle endwise of said housing towards one end thereof far enough to move said raceway member clear of said end, placing cross-bars between said end of said axle housing and the inner end of said raceway member, and then pressing said axle endwise through said inner raceway member towards the other end of said housing while holding said housing against movement in such direction.

6. The process of removing the inner raceway members of roller bearings from a roller bearing axle construction wherein an axle is enclosed in a tubular axle housing and has wheels pressed on the ends thereof beyond the ends of said housing, the bearings are interposed between said axle and enlarged end portions of said housing with their outer raceway members seated in the enlarged end portion of said housing and with their inner raceway members press-fitted on said axle and abutting at their inner end against shoulders thereon, and the ends of the housing are closed by annular closure plate sleeved on said axle between the wheels and the outer ends of said inner raceway members, which consists in removing the wheels, closure plates and outer bearing members for the axle construction, moving said axle endwise in said housing towards one end thereof far enough to move the inner raceway member on the corresponding end of said axle clear of said end of said housing, interposing a cross member between said end of said housing and the adjacent end of said inner raceway member and then pressing said axle endwise through said inner raceway member towards the other end of said housing while holding said housing against movement in such direction.

Signed at Canton, Ohio, this 19th day of Dec., 1927.

TRACY V. BUCKWALTER.